US012148992B2

(12) United States Patent
Shi

(10) Patent No.: US 12,148,992 B2
(45) Date of Patent: Nov. 19, 2024

(54) HYBRID HORN WAVEGUIDE ANTENNA

(71) Applicant: Aptiv Technologies AG, Schaffhausen (CH)

(72) Inventor: Shawn Shi, Thousand Oaks, CA (US)

(73) Assignee: Aptiv Technologies AG, Schaffhausen (CH)

(*) Notice: Subject to any disclaimer, the term of this patent is extended or adjusted under 35 U.S.C. 154(b) by 14 days.

(21) Appl. No.: 18/159,627

(22) Filed: Jan. 25, 2023

(65) Prior Publication Data

US 2024/0250443 A1 Jul. 25, 2024

(51) Int. Cl.
*H01Q 13/02* (2006.01)
*H01Q 1/32* (2006.01)

(52) U.S. Cl.
CPC ....... *H01Q 13/0266* (2013.01); *H01Q 1/3233* (2013.01); *H01Q 13/0283* (2013.01)

(58) Field of Classification Search
CPC ... H01Q 13/0266; H01Q 13/3233; H01P 1/02
See application file for complete search history.

(56) References Cited

U.S. PATENT DOCUMENTS 2,754,483 A * 7/1956 Zaleski ..................... H01P 1/02 333/248
2,851,686 A 9/1958 Hagaman
3,029,432 A 4/1962 Hansen
3,032,762 A 5/1962 Kerr
3,328,800 A 6/1967 Algeo (Continued)

FOREIGN PATENT DOCUMENTS

CA 2654470 A1 12/2007
CN 1254446 A 5/2000

(Continued)

OTHER PUBLICATIONS

Xu, et al., "CPW Center-Fed Single-Layer SIW Slot Antenna Array for Automotive Radars", Jun. 12, 2014, pp. 4528-4536.

(Continued)

*Primary Examiner* — Graham P Smith
*Assistant Examiner* — Austin M Back
(74) *Attorney, Agent, or Firm* — Harness, Dickey & Pierce, P.L.C.

(57) ABSTRACT

This document describes apparatuses, methods, and systems for a hybrid horn waveguide antenna. The hybrid horn waveguide antenna includes a waveguide, described in two sections, and an antenna section having both flaring features and step features. The first waveguide section is electrically coupled to a transmitter/receiver (e.g., transceiver) and defines an energy path along an x-axis. The second waveguide section transitions the energy path to travel along a z-axis. The antenna section has a first aperture that is coupled to the second waveguide section and includes flaring wall features in one plane (e.g., the E-plane) and step features in a second plane (e.g., the H-plane). The waveguide may further include an iris between the first waveguide section and the second waveguide section. Further, the hybrid horn waveguide antenna section may be formed from an upper structure and a lower structure manufactured via injection molding and then mated.

20 Claims, 6 Drawing Sheets

(56) References Cited

U.S. PATENT DOCUMENTS

| | | | | |
|---|---|---|---|---|
| 3,462,713 | A | 8/1969 | Knerr | |
| 3,473,162 | A | 10/1969 | Veith | |
| 3,579,149 | A | 5/1971 | Ramsey | |
| 3,594,806 | A | 7/1971 | Black et al. | |
| 3,597,710 | A | 8/1971 | Levy | |
| 3,852,689 | A | 12/1974 | Watson | |
| 4,157,516 | A | 6/1979 | Grijp | |
| 4,291,312 | A | 9/1981 | Kaloi | |
| 4,453,142 | A | 6/1984 | Murphy | |
| 4,562,416 | A | 12/1985 | Sedivec | |
| 4,590,480 | A | 5/1986 | Nikolayuk et al. | |
| 4,792,814 | A * | 12/1988 | Ebisui | H01Q 13/025 343/786 |
| 4,839,663 | A | 6/1989 | Kurtz | |
| 5,030,965 | A | 7/1991 | Park et al. | |
| 5,047,738 | A | 9/1991 | Wong et al. | |
| 5,065,123 | A | 11/1991 | Heckaman et al. | |
| 5,068,670 | A | 11/1991 | Maoz | |
| 5,113,197 | A | 5/1992 | Luh | |
| 5,337,065 | A | 8/1994 | Bonnet et al. | |
| 5,350,499 | A | 9/1994 | Shibaike et al. | |
| 5,541,612 | A | 7/1996 | Josefsson | |
| 5,638,079 | A | 6/1997 | Kastner et al. | |
| 5,923,225 | A | 7/1999 | Santos | |
| 5,926,147 | A | 7/1999 | Sehm et al. | |
| 5,982,256 | A | 11/1999 | Uchimura et al. | |
| 5,986,527 | A | 11/1999 | Ishikawa et al. | |
| 6,072,375 | A | 6/2000 | Adkins et al. | |
| 6,166,701 | A | 12/2000 | Park et al. | |
| 6,414,573 | B1 | 7/2002 | Swineford et al. | |
| 6,489,855 | B1 | 12/2002 | Kitamori et al. | |
| 6,535,083 | B1 | 3/2003 | Hageman et al. | |
| 6,622,370 | B1 | 9/2003 | Sherman et al. | |
| 6,788,918 | B2 | 9/2004 | Saitoh et al. | |
| 6,794,950 | B2 | 9/2004 | Toit et al. | |
| 6,859,114 | B2 | 2/2005 | Eleftheriades et al. | |
| 6,867,660 | B2 | 3/2005 | Kitamori et al. | |
| 6,958,662 | B1 | 10/2005 | Salmela et al. | |
| 6,992,541 | B2 | 1/2006 | Wright et al. | |
| 7,002,511 | B1 | 2/2006 | Ammar et al. | |
| 7,091,919 | B2 | 8/2006 | Bannon | |
| 7,142,165 | B2 | 11/2006 | Sanchez et al. | |
| 7,193,556 | B1 * | 3/2007 | Pereira | F41G 7/34 342/61 |
| 7,420,442 | B1 | 9/2008 | Forman | |
| 7,439,822 | B2 | 10/2008 | Shimura et al. | |
| 7,495,532 | B2 | 2/2009 | McKinzie, III | |
| 7,498,994 | B2 | 3/2009 | Vacanti | |
| 7,626,476 | B2 | 12/2009 | Kim et al. | |
| 7,659,799 | B2 | 2/2010 | Jun et al. | |
| 7,886,434 | B1 | 2/2011 | Forman | |
| 7,973,616 | B2 | 7/2011 | Shijo et al. | |
| 7,994,879 | B2 | 8/2011 | Kim et al. | |
| 8,013,694 | B2 | 9/2011 | Hiramatsu et al. | |
| 8,089,327 | B2 | 1/2012 | Margomenos et al. | |
| 8,159,316 | B2 | 4/2012 | Miyazato et al. | |
| 8,395,552 | B2 | 3/2013 | Geiler et al. | |
| 8,451,175 | B2 | 5/2013 | Gummalla et al. | |
| 8,451,189 | B1 | 5/2013 | Fluhler | |
| 8,576,023 | B1 | 11/2013 | Buckley et al. | |
| 8,604,990 | B1 | 12/2013 | Chen et al. | |
| 8,692,731 | B2 | 4/2014 | Lee et al. | |
| 8,717,124 | B2 | 5/2014 | Vanhille et al. | |
| 8,803,638 | B2 | 8/2014 | Kildal | |
| 8,948,562 | B2 | 2/2015 | Norris et al. | |
| 9,007,269 | B2 | 4/2015 | Lee et al. | |
| 9,203,139 | B2 | 12/2015 | Zhu et al. | |
| 9,203,155 | B2 | 12/2015 | Choi et al. | |
| 9,246,204 | B1 | 1/2016 | Kabakian | |
| 9,258,884 | B2 | 2/2016 | Saito | |
| 9,356,238 | B2 | 5/2016 | Norris et al. | |
| 9,368,878 | B2 | 6/2016 | Chen et al. | |
| 9,450,281 | B2 | 9/2016 | Kim | |
| 9,525,206 | B2 * | 12/2016 | Abe | H01Q 21/0037 |
| 9,537,212 | B2 | 1/2017 | Rosen et al. | |
| 9,647,313 | B2 | 5/2017 | Marconi et al. | |
| 9,653,773 | B2 | 5/2017 | Ferrari et al. | |
| 9,653,819 | B1 | 5/2017 | Izadian | |
| 9,673,532 | B2 | 6/2017 | Cheng et al. | |
| 9,806,393 | B2 | 10/2017 | Kildal et al. | |
| 9,806,431 | B1 | 10/2017 | Izadian | |
| 9,813,042 | B2 | 11/2017 | Xue et al. | |
| 9,843,301 | B1 | 12/2017 | Rodgers et al. | |
| 9,882,288 | B2 | 1/2018 | Black et al. | |
| 9,935,065 | B1 | 4/2018 | Baheti et al. | |
| 9,991,606 | B2 | 6/2018 | Kirino et al. | |
| 9,997,842 | B2 | 6/2018 | Kirino et al. | |
| 10,027,032 | B2 | 7/2018 | Kirino et al. | |
| 10,042,045 | B2 | 8/2018 | Kirino et al. | |
| 10,090,600 | B2 | 10/2018 | Kirino et al. | |
| 10,114,067 | B2 | 10/2018 | Lam et al. | |
| 10,153,533 | B2 | 12/2018 | Kirino | |
| 10,158,158 | B2 | 12/2018 | Kirino et al. | |
| 10,164,318 | B2 | 12/2018 | Seok et al. | |
| 10,164,344 | B2 | 12/2018 | Kirino et al. | |
| 10,186,787 | B1 | 1/2019 | Wang et al. | |
| 10,218,078 | B2 | 2/2019 | Kirino et al. | |
| 10,230,173 | B2 | 3/2019 | Kirino et al. | |
| 10,263,310 | B2 | 4/2019 | Kildal et al. | |
| 10,283,832 | B1 | 5/2019 | Chayat et al. | |
| 10,312,596 | B2 | 6/2019 | Gregoire | |
| 10,315,578 | B2 | 6/2019 | Kim et al. | |
| 10,320,083 | B2 | 6/2019 | Kirino et al. | |
| 10,333,227 | B2 | 6/2019 | Kirino et al. | |
| 10,374,323 | B2 | 8/2019 | Kamo et al. | |
| 10,381,317 | B2 | 8/2019 | Maaskant et al. | |
| 10,381,741 | B2 | 8/2019 | Kirino et al. | |
| 10,439,298 | B2 | 10/2019 | Kirino et al. | |
| 10,468,736 | B2 | 11/2019 | Mangaiahgari | |
| 10,505,282 | B2 | 12/2019 | Lilja | |
| 10,534,061 | B2 | 1/2020 | Vassilev et al. | |
| 10,559,889 | B2 | 2/2020 | Kirino et al. | |
| 10,594,045 | B2 | 3/2020 | Kirino et al. | |
| 10,601,144 | B2 | 3/2020 | Kamo et al. | |
| 10,608,345 | B2 | 3/2020 | Kirino et al. | |
| 10,613,216 | B2 | 4/2020 | Vacanti et al. | |
| 10,622,696 | B2 | 4/2020 | Kamo et al. | |
| 10,627,502 | B2 | 4/2020 | Kirino et al. | |
| 10,649,461 | B2 | 5/2020 | Han et al. | |
| 10,651,138 | B2 | 5/2020 | Kirino et al. | |
| 10,651,567 | B2 | 5/2020 | Kamo et al. | |
| 10,658,760 | B2 | 5/2020 | Kamo et al. | |
| 10,670,810 | B2 | 6/2020 | Sakr et al. | |
| 10,705,294 | B2 | 7/2020 | Guerber et al. | |
| 10,707,584 | B2 | 7/2020 | Kirino et al. | |
| 10,714,802 | B2 | 7/2020 | Kirino et al. | |
| 10,727,561 | B2 | 7/2020 | Kirino et al. | |
| 10,727,611 | B2 | 7/2020 | Kirino et al. | |
| 10,763,590 | B2 | 9/2020 | Kirino et al. | |
| 10,763,591 | B2 | 9/2020 | Kirino et al. | |
| 10,775,573 | B1 | 9/2020 | Hsu et al. | |
| 10,811,373 | B2 | 10/2020 | Zaman et al. | |
| 10,826,147 | B2 | 11/2020 | Sikina et al. | |
| 10,833,382 | B2 | 11/2020 | Sysouphat | |
| 10,833,385 | B2 | 11/2020 | Mangaiahgari | |
| 10,892,536 | B2 | 1/2021 | Fan et al. | |
| 10,944,184 | B2 | 3/2021 | Shi et al. | |
| 10,957,971 | B2 | 3/2021 | Doyle et al. | |
| 10,957,988 | B2 | 3/2021 | Kirino et al. | |
| 10,962,628 | B1 | 3/2021 | Laifenfeld et al. | |
| 10,971,824 | B2 | 4/2021 | Baumgartner et al. | |
| 10,983,194 | B1 | 4/2021 | Patel et al. | |
| 10,985,434 | B2 | 4/2021 | Wagner et al. | |
| 10,992,056 | B2 | 4/2021 | Kamo et al. | |
| 11,061,110 | B2 | 7/2021 | Kamo et al. | |
| 11,088,432 | B2 | 8/2021 | Seok et al. | |
| 11,088,464 | B2 | 8/2021 | Sato et al. | |
| 11,114,733 | B2 | 9/2021 | Doyle et al. | |
| 11,121,441 | B1 | 9/2021 | Rmili et al. | |
| 11,121,475 | B2 | 9/2021 | Yang et al. | |
| 11,169,325 | B2 | 11/2021 | Guerber et al. | |
| 11,171,399 | B2 | 11/2021 | Alexanian et al. | |
| 11,196,171 | B2 | 12/2021 | Doyle et al. | |
| 11,201,414 | B2 | 12/2021 | Doyle et al. | |

(56) References Cited

U.S. PATENT DOCUMENTS

| | | | |
|---|---|---|---|
| 11,249,011 | B2 | 2/2022 | Challener |
| 11,283,162 | B2 | 3/2022 | Doyle et al. |
| 11,289,787 | B2 | 3/2022 | Yang |
| 11,349,183 | B2 | 5/2022 | Rahiminejad et al. |
| 11,349,220 | B2 | 5/2022 | Alexanian et al. |
| 11,378,683 | B2 | 7/2022 | Alexanian et al. |
| 11,411,292 | B2 | 8/2022 | Kirino |
| 11,444,364 | B2 | 9/2022 | Shi |
| 11,495,871 | B2 | 11/2022 | Vosoogh et al. |
| 11,563,259 | B2 | 1/2023 | Alexanian et al. |
| 11,611,138 | B2 | 3/2023 | Ogawa et al. |
| 11,616,282 | B2 | 3/2023 | Yao et al. |
| 11,626,652 | B2 | 4/2023 | Vilenskiy et al. |
| 2002/0021197 | A1 | 2/2002 | Elco |
| 2003/0052828 | A1 | 3/2003 | Scherzer et al. |
| 2004/0041663 | A1 | 3/2004 | Uchimura et al. |
| 2004/0069984 | A1 | 4/2004 | Estes et al. |
| 2004/0090290 | A1 | 5/2004 | Teshirogi et al. |
| 2004/0174315 | A1 | 9/2004 | Miyata |
| 2005/0146474 | A1 | 7/2005 | Bannon |
| 2005/0237253 | A1 | 10/2005 | Kuo et al. |
| 2006/0038724 | A1 | 2/2006 | Tikhov et al. |
| 2006/0113598 | A1 | 6/2006 | Chen et al. |
| 2006/0158382 | A1 | 7/2006 | Nagai |
| 2007/0013598 | A1 | 1/2007 | Artis et al. |
| 2007/0054064 | A1 | 3/2007 | Ohmi et al. |
| 2007/0103381 | A1 | 5/2007 | Upton |
| 2008/0129409 | A1 | 6/2008 | Nagaishi et al. |
| 2008/0150821 | A1 | 6/2008 | Koch et al. |
| 2009/0040132 | A1 | 2/2009 | Sridhar et al. |
| 2009/0207090 | A1 | 8/2009 | Pettus et al. |
| 2009/0243762 | A1 | 10/2009 | Chen et al. |
| 2009/0243766 | A1 | 10/2009 | Miyagawa et al. |
| 2009/0300901 | A1 | 12/2009 | Artis et al. |
| 2010/0134376 | A1 | 6/2010 | Margomenos et al. |
| 2010/0321265 | A1 | 12/2010 | Yamaguchi et al. |
| 2011/0181482 | A1 | 7/2011 | Adams et al. |
| 2012/0013421 | A1 | 1/2012 | Hayata |
| 2012/0050125 | A1 | 3/2012 | Leiba et al. |
| 2012/0056776 | A1 | 3/2012 | Shijo et al. |
| 2012/0068316 | A1 | 3/2012 | Ligander |
| 2012/0163811 | A1 | 6/2012 | Doany et al. |
| 2012/0194399 | A1 | 8/2012 | Bily et al. |
| 2012/0242421 | A1 | 9/2012 | Robin et al. |
| 2012/0256796 | A1 | 10/2012 | Leiba |
| 2012/0280770 | A1 | 11/2012 | Abhari et al. |
| 2013/0057358 | A1 | 3/2013 | Anthony et al. |
| 2013/0082801 | A1 | 4/2013 | Rofougaran et al. |
| 2013/0154764 | A1* | 6/2013 | Runyon ................ H01P 11/001 333/135 |
| 2013/0300602 | A1 | 11/2013 | Zhou et al. |
| 2014/0015709 | A1 | 1/2014 | Shijo et al. |
| 2014/0091884 | A1 | 4/2014 | Flatters |
| 2014/0106684 | A1 | 4/2014 | Burns et al. |
| 2014/0327491 | A1 | 11/2014 | Kim et al. |
| 2015/0097633 | A1 | 4/2015 | Devries et al. |
| 2015/0229017 | A1 | 8/2015 | Suzuki et al. |
| 2015/0229027 | A1 | 8/2015 | Sonozaki et al. |
| 2015/0263429 | A1 | 9/2015 | Vahidpour et al. |
| 2015/0333726 | A1 | 11/2015 | Xue et al. |
| 2015/0357698 | A1 | 12/2015 | Kushta |
| 2015/0364804 | A1 | 12/2015 | Tong et al. |
| 2015/0364830 | A1 | 12/2015 | Tong et al. |
| 2016/0043455 | A1 | 2/2016 | Seler et al. |
| 2016/0049714 | A1 | 2/2016 | Ligander et al. |
| 2016/0056541 | A1 | 2/2016 | Tageman et al. |
| 2016/0118705 | A1 | 4/2016 | Tang et al. |
| 2016/0126637 | A1 | 5/2016 | Uemichi |
| 2016/0195612 | A1 | 7/2016 | Shi |
| 2016/0204495 | A1 | 7/2016 | Takeda et al. |
| 2016/0211582 | A1 | 7/2016 | Saraf |
| 2016/0276727 | A1 | 9/2016 | Dang et al. |
| 2016/0293557 | A1 | 10/2016 | Topak et al. |
| 2016/0301125 | A1 | 10/2016 | Kim et al. |
| 2017/0003377 | A1 | 1/2017 | Menge |
| 2017/0012335 | A1 | 1/2017 | Boutayeb |
| 2017/0040709 | A1* | 2/2017 | Abe ..................... H01Q 1/3233 |
| 2017/0084554 | A1 | 3/2017 | Dogiamis et al. |
| 2017/0288313 | A1 | 10/2017 | Chung et al. |
| 2017/0294719 | A1 | 10/2017 | Tatomir |
| 2017/0324135 | A1 | 11/2017 | Blech et al. |
| 2018/0013208 | A1 | 1/2018 | Izadian et al. |
| 2018/0032822 | A1 | 2/2018 | Frank et al. |
| 2018/0123245 | A1 | 5/2018 | Toda et al. |
| 2018/0131084 | A1 | 5/2018 | Park et al. |
| 2018/0212324 | A1 | 7/2018 | Tatomir |
| 2018/0226709 | A1 | 8/2018 | Mangaiahgari |
| 2018/0233465 | A1 | 8/2018 | Spella et al. |
| 2018/0254563 | A1 | 9/2018 | Sonozaki et al. |
| 2018/0284186 | A1 | 10/2018 | Chadha et al. |
| 2018/0301819 | A1 | 10/2018 | Kirino et al. |
| 2018/0301820 | A1 | 10/2018 | Bregman et al. |
| 2018/0343711 | A1 | 11/2018 | Wixforth et al. |
| 2018/0351261 | A1 | 12/2018 | Kamo et al. |
| 2018/0375185 | A1 | 12/2018 | Kirino et al. |
| 2019/0006743 | A1 | 1/2019 | Kirino et al. |
| 2019/0013563 | A1 | 1/2019 | Takeda et al. |
| 2019/0057945 | A1 | 2/2019 | Maaskant et al. |
| 2019/0109361 | A1 | 4/2019 | Ichinose et al. |
| 2019/0115644 | A1 | 4/2019 | Wang et al. |
| 2019/0187247 | A1 | 6/2019 | Zadian et al. |
| 2019/0235003 | A1* | 8/2019 | Paulsen .................. G01R 29/10 |
| 2019/0245276 | A1 | 8/2019 | Li et al. |
| 2019/0252778 | A1 | 8/2019 | Duan |
| 2019/0260137 | A1 | 8/2019 | Watanabe et al. |
| 2019/0324134 | A1 | 10/2019 | Cattle |
| 2020/0021001 | A1 | 1/2020 | Mangaiahgari |
| 2020/0044360 | A1 | 2/2020 | Kamo et al. |
| 2020/0059002 | A1 | 2/2020 | Renard et al. |
| 2020/0064483 | A1 | 2/2020 | Li et al. |
| 2020/0076086 | A1 | 3/2020 | Cheng et al. |
| 2020/0106171 | A1 | 4/2020 | Shepeleva et al. |
| 2020/0112077 | A1 | 4/2020 | Kamo et al. |
| 2020/0166637 | A1 | 5/2020 | Hess et al. |
| 2020/0203849 | A1 | 6/2020 | Lim et al. |
| 2020/0212594 | A1 | 7/2020 | Kirino et al. |
| 2020/0235453 | A1 | 7/2020 | Lang |
| 2020/0284907 | A1 | 9/2020 | Gupta et al. |
| 2020/0287293 | A1 | 9/2020 | Shi et al. |
| 2020/0319293 | A1 | 10/2020 | Kuriyama et al. |
| 2020/0343612 | A1 | 10/2020 | Shi |
| 2020/0346581 | A1 | 11/2020 | Lawson et al. |
| 2020/0373678 | A1 | 11/2020 | Park et al. |
| 2021/0028528 | A1 | 1/2021 | Alexanian et al. |
| 2021/0036393 | A1 | 2/2021 | Mangaiahgari |
| 2021/0104818 | A1 | 4/2021 | Li et al. |
| 2021/0110217 | A1 | 4/2021 | Gunel |
| 2021/0159577 | A1 | 5/2021 | Carlred et al. |
| 2021/0218154 | A1 | 7/2021 | Shi et al. |
| 2021/0242581 | A1 | 8/2021 | Rossiter et al. |
| 2021/0249777 | A1 | 8/2021 | Alexanian et al. |
| 2021/0305667 | A1 | 9/2021 | Bencivenni |
| 2022/0094071 | A1 | 3/2022 | Doyle et al. |
| 2022/0109246 | A1 | 4/2022 | Emanuelsson et al. |
| 2022/0196794 | A1 | 6/2022 | Foroozesh et al. |

FOREIGN PATENT DOCUMENTS

| | | | |
|---|---|---|---|
| CN | 1620738 | A | 5/2005 |
| CN | 2796131 | | 7/2006 |
| CN | 101584080 | A | 11/2009 |
| CN | 201383535 | | 1/2010 |
| CN | 201868568 | U | 6/2011 |
| CN | 102157787 | A | 8/2011 |
| CN | 102420352 | A | 4/2012 |
| CN | 103326125 | A | 9/2013 |
| CN | 203277633 | U | 11/2013 |
| CN | 103490168 | A | 1/2014 |
| CN | 103515682 | A | 1/2014 |
| CN | 102142593 | B | 6/2014 |
| CN | 104101867 | A | 10/2014 |
| CN | 104900956 | A | 9/2015 |
| CN | 104993254 | A | 10/2015 |
| CN | 105071019 | A | 11/2015 |

(56) References Cited

FOREIGN PATENT DOCUMENTS

| | | | |
|---|---|---|---|
| CN | 105609909 | A | 5/2016 |
| CN | 105958167 | A | 9/2016 |
| CN | 107317075 | A | 11/2017 |
| CN | 108258392 | A | 7/2018 |
| CN | 109286081 | A | 1/2019 |
| CN | 109643856 | A | 4/2019 |
| CN | 109980361 | A | 7/2019 |
| CN | 110085990 | A | 8/2019 |
| CN | 209389219 | U | 9/2019 |
| CN | 110401022 | A | 11/2019 |
| CN | 111123210 | A | 5/2020 |
| CN | 111480090 | A | 7/2020 |
| CN | 108376821 | B | 10/2020 |
| CN | 110474137 | B | 11/2020 |
| CN | 109326863 | B | 12/2020 |
| CN | 112241007 | A | 1/2021 |
| CN | 212604823 | U | 2/2021 |
| CN | 112986951 | A | 6/2021 |
| CN | 112290182 | B | 7/2021 |
| CN | 113193323 | B | 10/2021 |
| CN | 214706247 | U | 11/2021 |
| DE | 112017006415 | | 9/2019 |
| DE | 102019200893 | A1 | 7/2020 |
| EP | 0174579 | A2 | 3/1986 |
| EP | 0818058 | A1 | 1/1998 |
| EP | 2267841 | A1 | 12/2010 |
| EP | 2500978 | A1 | 9/2012 |
| EP | 2843758 | A1 | 3/2015 |
| EP | 2766224 | B1 | 12/2018 |
| EP | 3460903 | A1 | 3/2019 |
| EP | 3785995 | A1 | 3/2021 |
| EP | 3862773 | A1 | 8/2021 |
| EP | 4089840 | A1 | 11/2022 |
| GB | 893008 | A | 4/1962 |
| GB | 2463711 | A | 3/2010 |
| GB | 2489950 | A | 10/2012 |
| IN | 105680133 | A | 6/2016 |
| JP | 2000183222 | A | 6/2000 |
| JP | 2003198242 | A | 7/2003 |
| JP | 2003289201 | A | 10/2003 |
| JP | 5269902 | B2 | 8/2013 |
| JP | 2013187752 | A | 9/2013 |
| JP | 2015216533 | A | 12/2015 |
| KR | 20080044752 | A | 5/2008 |
| KR | 1020080044752 | A | 5/2008 |
| KR | 20080105396 | A | 12/2008 |
| KR | 101092846 | B1 | 12/2011 |
| KR | 102154338 | B1 | 9/2020 |
| WO | 9934477 | A1 | 7/1999 |
| WO | 2013189513 | A1 | 12/2013 |
| WO | 2018003932 | A1 | 1/2018 |
| WO | 2018052335 | A1 | 3/2018 |
| WO | 2019085368 | A1 | 5/2019 |
| WO | 2020082363 | A1 | 4/2020 |
| WO | 2021072380 | A1 | 4/2021 |
| WO | 2022122319 | A1 | 6/2022 |
| WO | 2022225804 | A1 | 10/2022 |

OTHER PUBLICATIONS

Yu, et al., "Optimization and Implementation of SIW Slot Array for Both Medium- and Long-Range 77 GHz Automotive Radar Application", IEEE Transactions on Antennas and Propagation, vol. 66, No. 7, Jul. 2018, pp. 3769-3774.

Yuasa, et al., "A millimeter wave wideband differential line to waveguide transition using short ended slot line", Oct. 2014, pp. 1004-1007.

Aulia Dewantari et al., "Flared SIW antenna design and transceiving experiments for W-band SAR", International Journal of RF and Microwave Computer-Aided Engineering, Wiley Interscience, Hoboken, USA, vol. 28, No. 9, May 9, 2018, XP072009558.

"Extended European Search Report", EP Application No. 18153137.7, Jun. 15, 2018, 8 pages.

"Extended European Search Report", EP Application No. 20155296.5, Jul. 13, 2020, 12 pages.

"Extended European Search Report", EP Application No. 20166797, Sep. 16, 2020, 11 pages.

"Extended European Search Report", EP Application No. 21211165.2, May 13, 2022, 12 pages.

"Extended European Search Report", EP Application No. 21211167.8, May 19, 2022, 10 pages.

"Extended European Search Report", EP Application No. 21211168.6, May 13, 2022, 11 pages.

"Extended European Search Report", EP Application No. 21211452.4, May 16, 2022, 10 pages.

"Extended European Search Report", EP Application No. 21211474.8, Apr. 20, 2022, 14 pages.

"Extended European Search Report", EP Application No. 21211478.9, May 19, 2022, 10 pages.

"Extended European Search Report", EP Application No. 21212703.9, May 3, 2022, 13 pages.

"Extended European Search Report", EP Application No. 21215901.6, Jun. 9, 2022, 8 pages.

"Extended European Search Report", EP Application No. 21216319.0, Jun. 10, 2022, 12 pages.

"Extended European Search Report", EP Application No. 22160898.7, Aug. 4, 2022, 11 pages.

"Extended European Search Report", EP Application No. 22166998.9, Sep. 9, 2022, 12 pages.

"Extended European Search Report", EP Application No. 22183888.1, Dec. 20, 2022, 10 pages.

"Extended European Search Report", EP Application No. 22183892.3, Dec. 2, 2022, 8 pages.

"Extended European Search Report", EP Application No. 22184924.3, Dec. 2, 2022, 13 pages.

"Foreign Office Action", CN Application No. 201810122408.4, Jun. 2, 2021, 15 pages.

"Foreign Office Action", CN Application No. 201810122408.4, Oct. 18, 2021, 19 pages.

"Foreign Office Action", CN Application No. 202010146513.9, Feb. 7, 2022, 14 pages.

"WR-90 Waveguides", Pasternack Enterprises, Inc., 2016, Retrieved from https://web.archive.org/web/20160308205114/http://www.pasternack.com:80/wr-90-waveguides-category.aspx, 2 pages.

Adams, et al., "Dual Band Frequency Scanned, Height Finder Antenna", 1991 21st European Microwave Conference, 1991, 6 pages.

Alhuwaimel, et al., "Performance Enhancement of a Slotted Waveguide Antenna by Utilizing Parasitic Elements", Sep. 7, 2015, pp. 1303-1306.

Bauer, et al., "A wideband transition from substrate integrated waveguide to differential microstrip lines in multilayer substrates", Sep. 2010, pp. 811-813.

Chaloun, et al., "A Wideband 122 GHz Cavity-Backed Dipole Antenna for Millimeter-Wave Radar Altimetry", 2020 14th European Conference on Antennas and Propagation (EUCAP), Mar. 15, 2020, 4 pages.

Deutschmann, et al., "A Full W-Band Waveguide-to-Differential Microstrip Transition", Jun. 2019, pp. 335-338.

Furtula, et al., "Waveguide Bandpass Filters for Millimeter-Wave Radiometers", Journal of Infrared, Millimeter and Terahertz Waves, 2013, 9 pages.

Giese, et al., "Compact Wideband Single-ended and Differential Microstrip-to-waveguide Transitions at W-band", Jul. 2015, 4 pages.

Gray, et al., "Carbon Fibre Reinforced Plastic Slotted Waveguide Antenna", Proceedings of Asia-Pacific Microwave Conference 2010, pp. 307-310.

Hansen, et al., "D-Band FMCW Radar Sensor for Industrial Wideband Applications with Fully-Differential MMIC-to-RWG Interface in SIW", 2021 IEEE/MTT-S International Microwave Symposium, Jun. 7, 2021, pp. 815-818.

Hasan, et al., "F-Band Differential Microstrip Patch Antenna Array and Waveguide to Differential Microstrip Line Transition for FMCW Radar Sensor", IEEE Sensors Journal, vol. 19, No. 15, Aug. 1, 2019, pp. 6486-6496.

(56) References Cited

OTHER PUBLICATIONS

Hausman, "Termination Insensitive Mixers", 2011 IEEE International Conference on Microwaves, Communications, Antennas and Electronic Systems (COMCAS 2011), Nov. 7, 2011, 13 pages.
Huang, et al., "The Rectangular Waveguide Board Wall Slot Array Antenna Integrated with One Dimensional Subwavelength Periodic Corrugated Grooves and Artificially Soft Surface Structure", Dec. 20, 2008, 10 pages.
Jankovic, et al., "Stepped Bend Substrate Integrated Waveguide to Rectangular Waveguide Transitions", Jun. 2016, 2 pages.
Li, et al., "Millimetre-wave slotted array antenna based on double-layer substrate integrated waveguide", Jun. 1, 2015, pp. 882-888.
Lin, et al., "A THz Waveguide Bandpass Filter Design Using an Artificial Neural Network", Micromachines 13(6), May 2022, 11 pages.
Mak, et al., "A Magnetoelectric Dipole Leaky-Wave Antenna for Millimeter-Wave Application", Dec. 12, 2017, pp. 6395-6402.
Mallahzadeh, et al., "A Low Cross-Polarization Slotted Ridged SIW Array Antenna Design With Mutual Coupling Considerations", Jul. 17, 2015, pp. 4324-4333.
Ogiwara, et al., "2-D MoM Analysis of the Choke Structure for Isolation Improvement between Two Waveguide Slot Array Antennas", Proceedings of Asia-Pacific Microwave Conference 2007, 4 pages.
Razmhosseini, et al., "Parasitic Slot Elements for Bandwidth Enhancement of Slotted Waveguide Antennas", 2019 IEEE 90th Vehicular Technology Conference, Sep. 2019, 5 pages.
Rossello, et al., "Substrate Integrated Waveguide Aperture Coupled Patch Antenna Array for 24 GHz Wireless Backhaul and Radar Applications", Nov. 16, 2014, 2 pages.
Schneider, et al., "A Low-Loss W-Band Frequency-Scanning Antenna for Wideband Multichannel Radar Applications", IEEE Antennas and Wireless Propagation Letters, vol. 18, No. 4, Apr. 2019, pp. 806-810.
Serrano, et al., "Lowpass Filter Design for Space Applications in Waveguide Technology Using Alternative Topologies", Jan. 2013, 117 pages.
Shehab, et al., "Substrate-Integrated-Waveguide Power Dividers", Oct. 15, 2019, pp. 27-38.
Tong, et al., "A Wide Band Transition from Waveguide to Differential Microstrip Lines", Dec. 2008, 5 pages.
Wang, et al., "A 79-GHz LTCC differential microstrip line to laminated waveguide transition using high permittivity material", Dec. 2010, pp. 1593-1596.
Wang, et al., "Low-loss frequency scanning planar array with hybrid feeding structure for low-altitude detection radar", Sep. 13, 2019, pp. 6708-6711.
Wang, et al., "Mechanical and Dielectric Strength of Laminated Epoxy Dielectric Graded Materials", Mar. 2020, 15 pages.
Wu, et al., "A Planar W-Band Large-Scale High-Gain Substrate-Integrated Waveguide Slot Array", Feb. 3, 2020, pp. 6429-6434.
Wu, et al., "The Substrate Integrated Circuits—A New Concept for High-Frequency Electronics and Optoelectronics", Dec. 2003, 8 pages.
"Extended European Search Report", EP Application No. 23158037.4, Aug. 17, 2023, 9 pages.
"Extended European Search Report", EP Application No. 23158947.4, Aug. 17, 2023, 11 pages.
"Foreign Office Action", CN Application No. 202111550163.3, Jun. 17, 2023, 25 pages.
"Foreign Office Action", CN Application No. 202111550448.7, Jun. 17, 2023, 19 pages.
"Foreign Office Action", CN Application No. 202111551711.4, Jun. 17, 2023, 29 pages.
"Foreign Office Action", CN Application No. 202111551878.0, Jun. 15, 2023, 20 pages.
"Foreign Office Action", CN Application No. 202111563233.9, May 31, 2023, 15 pages.
"Foreign Office Action", CN Application No. 202111652507.1, Jun. 26, 2023, 14 pages.
"Foreign Office Action", CN Application No. 202210251362.2, Jun. 28, 2023, 15 pages.
Ghassemi, et al., "Millimeter-Wave Integrated Pyramidal Horn Antenna Made of Multilayer Printed Circuit Board (PCB) Process", IEEE Transactions on Antennas and Propagation, vol. 60, No. 9, Sep. 2012, pp. 4432-4435.
Hausman, et al., "Termination Insensitive Mixers", 2011 IEEE International Conference on Microwaves, Communications, Antennas and Electronic Systems (COMCAS 2011), Dec. 19, 2011, 13 pages.

* cited by examiner

HYBRID HORN WAVEGUIDE ANTENNA

BACKGROUND

Automotive systems may be equipped with radar systems that acquire information about the surrounding environment. Such radar systems use waveguides and/or antennas to provide better directivity of the radiation beam of the radar system. The waveguide and antenna can be used to form a radiation beam that covers a particular field-of-view (e.g., in a travel path of a vehicle). As the automotive industry continues to increasingly rely on radar systems to detect objects in the environment, accurately covering the desired field-of-view of the associated radiation beam is becoming more important to maximize the safety of the automotive systems.

SUMMARY

This document is directed to a hybrid horn waveguide antenna, methods for forming the hybrid horn waveguide antenna, and systems including the hybrid horn waveguide antenna. Some aspects described below include an apparatus comprising a waveguide antenna configured to guide electromagnetic energy through a channel defining an energy path for the electromagnetic energy.

The waveguide antenna comprises a first waveguide section configured to propagate the energy path along an x-axis. The first waveguide section comprises a first port centered around the x-axis at which the electromagnetic energy enters or exits the waveguide antenna. The first waveguide section further comprises a first channel portion extending longitudinally along the x-axis. The waveguide antenna further comprises a second waveguide section configured to propagate the energy path from the x-axis to a z-axis, the z-axis being orthogonal to the x-axis. The second waveguide section comprises a second channel portion extending longitudinally along the z-axis. The second waveguide section further comprises a second port centered around the z-axis.

The waveguide antenna further comprises an antenna section having an inverted trapezoidal prism shape and configured to radiate or receive the electromagnetic energy. The antenna section comprises a first aperture configured to align with the second port of the second waveguide section. The antenna section further comprises a first step feature extending from a first side of the first aperture nearest to the first port along the x-axis towards the first port. The antenna section further comprises a second step feature extending from a second side of the first aperture, opposite the first side, along the x-axis away from the first port. The antenna section further comprises a first wall extending along the z-axis from an edge of the first step feature that is opposite the first side of the first aperture. The antenna section further comprises a second wall extending along the z-axis from an edge of the second step feature that is opposite the second side of the first aperture. The antenna section further comprises a third wall extending along a y-axis and the z-axis from a third side of the aperture, the y-axis being orthogonal to the x-axis and the z-axis, the third side being orthogonal to the first side and the second side, the third wall flaring away from the first aperture. The antenna section further comprises a fourth wall extending along the y-axis and the z-axis from a fourth side of the first aperture, opposite the third side, the fourth wall flaring away from the first aperture. The antenna section further comprises a second aperture opposite the first aperture and defined by edges of the first wall, the second wall, the third wall, and the fourth wall.

Other aspects described below include a method of forming a hybrid horn waveguide antenna. The method comprises forming an upper structure of a waveguide antenna configured to guide electromagnetic energy through a channel defining an energy path for the electromagnetic energy, the upper structure comprising an upper portion of the first waveguide section, an upper portion of the second waveguide section, and the antenna section. The method further comprises forming a lower structure of the waveguide antenna, the lower structure comprising a lower portion of the first waveguide section, and a lower portion of the second waveguide section. The method further comprises mating the upper structure to the lower structure.

Other aspects described below include a system comprising a monolithic microwave integrated circuit, and a waveguide antenna, as described above, electrically coupled to the monolithic microwave integrated circuit.

This Summary introduces simplified concepts related to a hybrid horn waveguide antenna, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of a hybrid horn waveguide antenna are described in this document with reference to the Drawings that may use same numbers to reference like features and components, and hyphenated numbers to designate variations of these like features and components. The Drawings are organized as follows:

FIG. 3-1 illustrates example radiation beam characteristics of a hybrid horn waveguide antenna, in accordance with this disclosure;

FIG. 3-2 illustrates example impedance matching characteristics provided by a hybrid horn waveguide antenna, in accordance with this disclosure;

DETAILED DESCRIPTION

Overview

Figure 1:
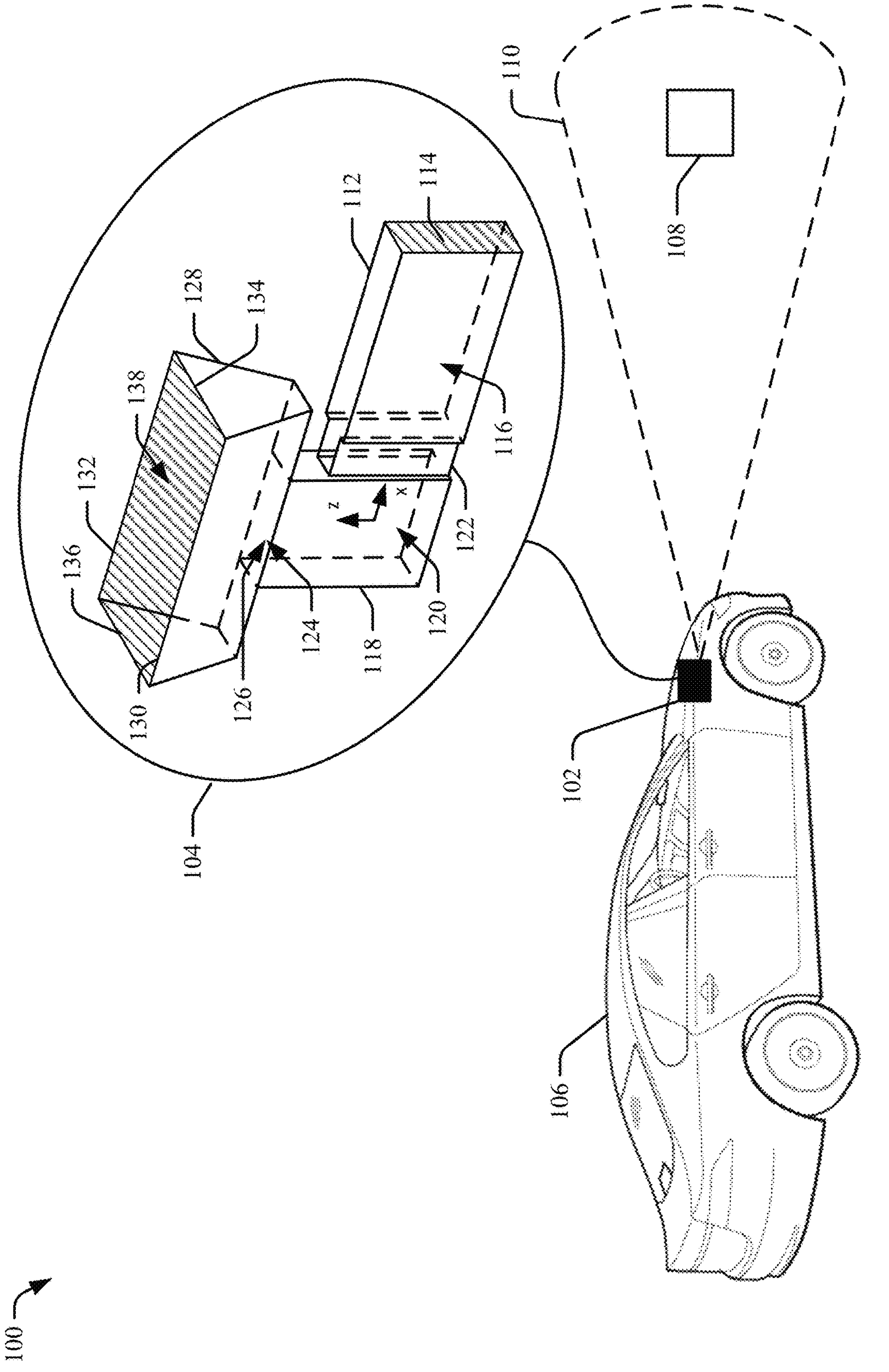
FIG. 1 illustrates an example environment in which a radar system with a hybrid horn waveguide antenna is used on a vehicle, in accordance with this disclosure.

As automotive systems become more autonomous, sensing technologies are increasingly being used to detect and track objects in the environment in which an autonomous or semi-autonomous vehicle travels. These sensing technologies include sensor systems such as camera systems, radar systems, LiDAR systems, and the like. Many manufacturers use some combination of the various sensor systems that takes advantage of the different strengths each sensor system provides. For example, radar systems may be less affected by weather than camera and LiDAR systems.

Each sensor of a sensor system may be associated with a field-of-view (FOV) around the vehicle. For example, radar sensors use waveguides and antennas to transmit electromagnetic energy within its FOV and receive electromagnetic energy that is reflected off objects located in the associated FOV. Designing the waveguides and antennas to precisely shape and propagate a radiation beam of electromagnetic energy that covers the associated FOV assures that objects located anywhere within the FOV may be detected. Conventionally, engineers have used a horn antenna (e.g., an antenna with walls that flare out from an aperture in each of the four sides of the antenna structure) or a step antenna (e.g., an antenna that has a step feature expanding from the aperture in each of the four sides of the aperture and has walls that do not flare). The horn antenna, characterized by flaring walls in one or two planes extending from the edges of an aperture, can provide good input impedance matching but produces a beam that is wide. The step antenna, characterized by a step feature extending from the four edges of an aperture and parallel walls in each of two planes, may produce a narrower beam in at least one plane but does not adequately match the input impedance of the coupled circuitry.

In contrast, the hybrid horn waveguide antenna, as described herein, may include the advantages of the traditional horn antenna and the step antenna and minimize the disadvantages of each. The hybrid horn structure maintains a wider beam with moderate roll-off in one plane (e.g., the E-plane) and a narrow beam with low sidelobes in another plane (e.g., the H-plane). Additionally, the input impedance matching is similar to the horn antenna. An iris in the waveguide portion of the hybrid horn waveguide antenna can further be used to match the input impedance.

This document describes apparatuses, methods, and systems for a hybrid horn waveguide antenna. The hybrid horn waveguide antenna includes a waveguide, described in two sections, and an antenna section having both flaring features and step features. The first waveguide section is electrically coupled to a transmitter/receiver (e.g., transceiver) and defines an energy path along an x-axis. The second waveguide section transitions the energy path to travel along a z-axis. The antenna section has a first aperture that is coupled to the second waveguide section and includes flaring wall features in one plane (e.g., the E-plane) and step features in a second plane (e.g., the H-plane). The waveguide may further include an iris between the first waveguide section and the second waveguide section. Further, the hybrid horn waveguide antenna section may be formed from an upper structure and a lower structure manufactured via injection molding and then mated.

Example Environment

FIG. 1 illustrates an example environment 100 in which a radar system 102 with a hybrid horn waveguide antenna 104 is used on a vehicle 106, in accordance with this disclosure. The vehicle 106 may use the hybrid horn waveguide antenna 104 to enable operations of the radar system 102 that is configured to determine a proximity, an angle, or a velocity of one or more objects 108 in the proximity of the vehicle 106.

Although illustrated as a car, the vehicle 106 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the hybrid horn waveguide antenna 104 and support techniques described herein.

In the depicted environment 100, the radar system 102 is mounted near, or integrated within, a front portion of the vehicle 106 to detect the object 108 and avoid collisions. The radar system 102 provides a FOV 110 towards the one or more objects 108. The radar system 102 can project the FOV 110 from any exterior surface of the vehicle 106. For example, vehicle manufacturers can integrate the radar system 102 into a bumper, side mirror, headlights, rear lights, or any other interior or exterior location where the object 108 requires detection. In some cases, the vehicle 106 includes multiple radar systems 102, such as a first radar system 102 and a second radar system 102 that provide a larger FOV 110. In general, vehicle manufacturers can design the locations of the one or more radar systems 102 to provide a particular FOV 110 that encompasses a region of interest, including, for instance, in or around a travel lane aligned with a vehicle path.

Example FOVs 110 include a 360-degree FOV, one or more 180-degree fields-of-view, one or more 90-degree fields-of-view, and so forth, which can overlap or be combined into a FOV 110 of a particular size. The hybrid horn waveguide antenna 104 may radiate a beam of electromagnetic energy that is wider and has a gentle roll-off in the plane (e.g., the E-plane) in which the flaring occurs. This beam may be narrower in the plane (e.g., the H-plane) that includes the step features. Shaping a beam using the hybrid horn waveguide antenna 104 may ensure that the desired FOV 110 is adequately covered by the radar system 102.

The radar system 102 emits electromagnetic radiation by transmitting one or more electromagnetic signals or waveforms via one or more hybrid horn waveguide antennas 104. In the environment 100, the radar system 102 can detect and track the object 108 by transmitting and receiving one or more radar signals. For example, the radar system 102 can transmit electromagnetic signals between 100 and 400 gigahertz (GHz), between 4 and 100 GHz, or between approximately 70 and 80 GHz.

The radar system 102 can determine a distance to the object 108 based on the time it takes for the signals to travel from the radar system 102 to the object 108 and from the object 108 back to the radar system 102. The radar system 102 can also determine the location of the object 108 in terms of an angle based on the direction of a maximum amplitude echo signal received by the radar system 102.

The radar system 102 can be part of the vehicle 106. The vehicle 106 can also include at least one automotive system that relies on data from the radar system 102, including a driver-assistance system, an autonomous-driving system, or a semi-autonomous-driving system. The radar system 102 can include an interface to the automotive systems. The radar system 102 can output, via the interface, a signal based on electromagnetic energy received by the radar system 102.

Generally, the automotive systems of the vehicle 106 use radar data provided by the radar system 102 to perform a function. For example, a driver-assistance system can provide blind-spot monitoring and generate an alert indicating a potential collision with the object 108 detected by the radar system 102. In this case, the radar data from the radar system 102 indicates when it is safe or unsafe to change lanes. An autonomous-driving system may move the vehicle 106 to a particular location on the road while avoiding collisions with the object 108 detected by the radar system 102. The radar data provided by the radar system 102 can provide information about a distance to and the location of the object 108 to enable the autonomous-driving system to perform emergency braking, perform a lane change, or adjust the speed of the vehicle 106.

The radar system 102 generally includes a transmitter (not illustrated) and at least one hybrid horn waveguide antenna 104 to transmit electromagnetic signals. The radar system 102 generally includes a receiver (not illustrated) and at least one hybrid horn waveguide antenna 104 to receive reflected versions of these electromagnetic signals. The transmitter includes components for emitting electromagnetic signals. The receiver includes components to detect the reflected electromagnetic signals. The transmitter and the receiver can be incorporated together as a transceiver on the same integrated circuit (e.g., a transceiver integrated circuit) or separately on the same or different integrated circuits.

The radar system 102 also includes one or more processors (not illustrated) and computer-readable storage media (CRM) (not illustrated). The processor can be a microprocessor, a system-on-chip, monolithic microwave integrated circuit (MMIC), or the like. The processor executes instructions stored within the CRM. As an example, the processor can control the operation of the transmitter. The processor can also process electromagnetic energy received by the hybrid horn waveguide antenna 104 and determine the location of the object 108 relative to the radar system 102. The processor can also generate radar data for the automotive systems. For example, the processor can control, based on processed electromagnetic energy from the hybrid horn waveguide antenna 104, an autonomous or semi-autonomous driving system of the vehicle 106.

The hybrid horn waveguide antenna 104 defines an energy path for electromagnetic energy to propagate through the hybrid horn waveguide antenna 104. The hybrid horn waveguide antenna 104 has a first waveguide section 112 including a first port 114.

The first port 114 may be coupled to transmit/receive circuitry of a sensor system (e.g., a MMIC associated with the radar system 102). The first waveguide section 112 includes a first channel portion 116 (e.g., a first portion of the energy path) that extends from the first port 114 longitudinally through the first waveguide section 112. A second waveguide section 118 extends the first channel portion 116 via a second channel portion 120 (e.g., a second portion of the energy path) that transitions the energy path in a direction orthogonal to the first channel portion 116 (e.g., transitioning the energy path from traveling along an x-axis to traveling along a z-axis). An iris 122 may be disposed between the first waveguide section 112 and the second waveguide section 118 and is configured to match the input impedance at the first port 114. The energy path continues through a second port 124 aligned with a first aperture 126 of an antenna section 128.

The antenna section 128 has an inverted (in relation to the second waveguide section 118) trapezoidal prism shape. Two opposing walls 130, 132 of the antenna section 128 flare out from two opposing edges of the first aperture 126. Two other opposing walls 134, 136, parallel to one another, of the antenna section 128 extend orthogonally from the edges of step features that extend from the other two opposing edges of the first aperture 126. The top edges of the walls 130, 132, 134, 136 (opposite the first aperture 126) form a second aperture 138 from which electromagnetic energy may enter or exit the hybrid horn waveguide antenna 104. The flaring walls may form a relatively wide beam in the E-plane, and the parallel walls along with the step features may form a relatively narrow beam with low sidelobes in the H-plane. In this manner, the hybrid horn waveguide antenna 104 can be configured to transmit or receive a beam shaped to cover a specific FOV 110. Additionally, using step features in only one plane as opposed to two planes may reduce the impedance imbalance between the hybrid horn waveguide antenna 104 and an input/output device.

Example Architecture

Figure 2:
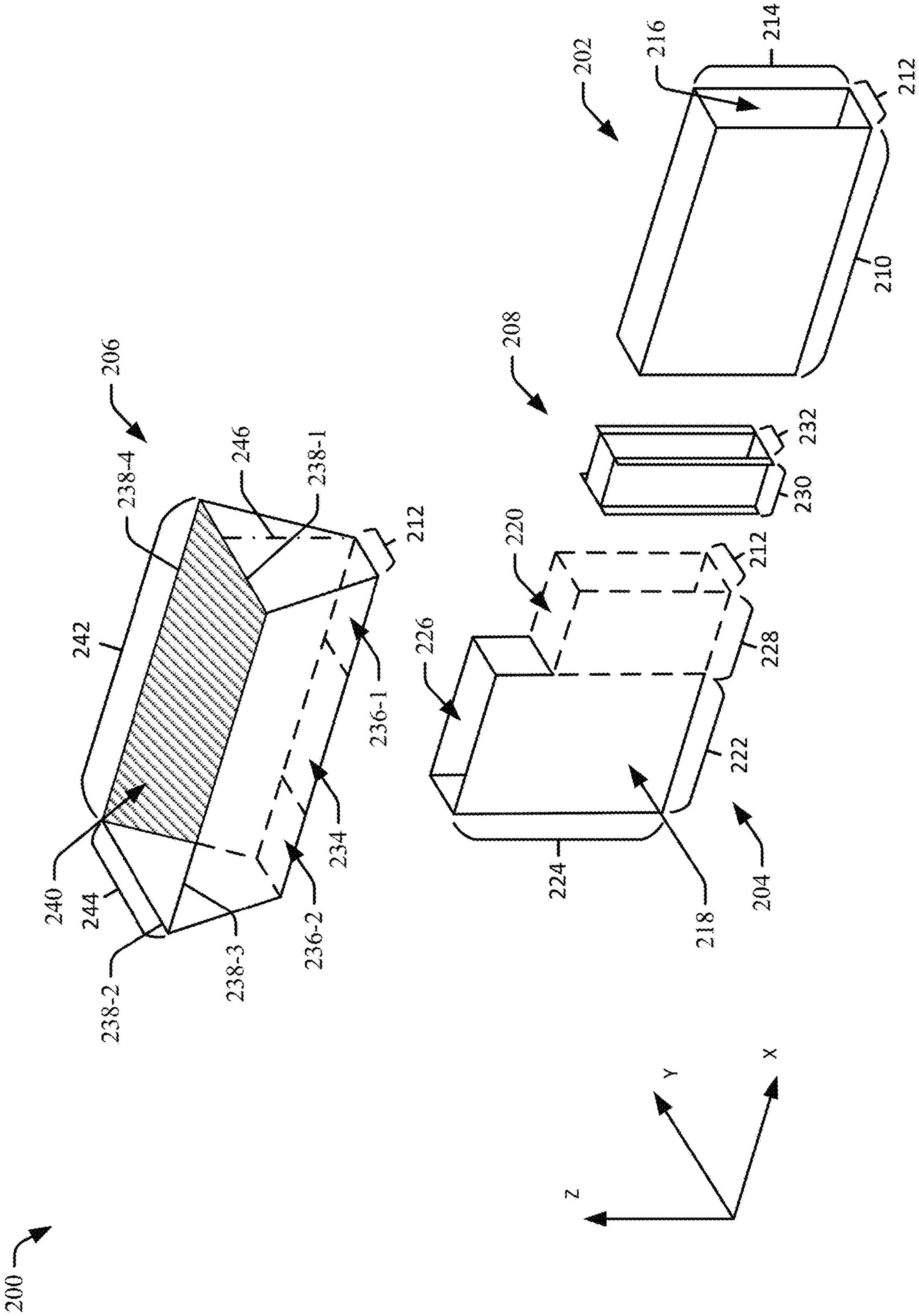
FIG. 2 illustrates sections of a hybrid horn waveguide antenna, in accordance with this disclosure.

FIG. 2 illustrates sections of a hybrid horn waveguide antenna 200 (e.g., the hybrid horn waveguide antenna 104), in accordance with this disclosure. The hybrid horn waveguide antenna 200 is configured to guide electromagnetic energy through a channel that defines an energy path for electromagnetic energy and includes a first waveguide section 202, a second waveguide section 204, and an antenna section 206. Additionally, the hybrid horn waveguide antenna 200 can include an iris 208.

The first waveguide section 202 is configured to propagate the energy path along an x-axis. It has a first length 210 along the x-axis, a first width 212 along a y-axis, and a first height 214 along a z-axis. The first waveguide section 202 includes a first port 216. The first port 216 can be coupled to transmit and/or receive circuity (e.g., a MIMIC, a digital-to-analog converter, an analog-to-digital converter). A first channel portion runs longitudinally along the x-axis through the first waveguide section.

The second waveguide section 204 continues the energy path and transitions the energy from propagating along the x-axis to propagating along the z-axis. The second waveguide section 204 accomplishes this transition by bending the energy path at a sharp right angle (e.g., 90° angle) between the x-axis and the z-axis. A sharp right angle is used as opposed to a gentler transitional curve or chamfer to reduce leakage due to the manufacturing process as described with respect to FIGS. 4 and 5.

The second waveguide section 204 includes a main portion 218 and may include an optional portion 220. The main portion 218 has a second length 222, the first width 212, and a second height 224. The second height 224 of the main portion 218 may be greater (e.g., 1 millimeter (mm) greater as may be required per limitations of a manufacturing process) than the first height 214 of the first waveguide section 202. The main portion 218 includes a second port 226 that is coupled to the antenna section 206.

The optional portion 220, if present, has a third length 228, the first width 212, and the first height 214. The third length 228 would depend on the placement of the iris 208 and on the wavelength of the electromagnetic energy being propagated. However, the optional portion 220 becomes unnecessary if the second waveguide section 204 is designed with appropriate dimensions to accommodate the wavelength. To minimize the size of the hybrid horn waveguide antenna 200, the second waveguide section 204 may not include the optional portion 220.

The iris 208 can be disposed between the first waveguide section 202 and the second waveguide section 204. The iris 208 has a fourth length 230 and the first height 214. The iris 208 has vertical parallel walls (along the z-axis) that define a second width 232 that is different than the first width 212. Although the second width 232 of the iris 208 can be either narrower or wider than the first width 212, a narrower second width 232 (e.g., 0.8 mm to 0.9 mm narrower as may be required per limitations of the manufacturing process) than the first width 212 reduces the footprint of the hybrid horn waveguide antenna 200. The iris 208 can be strategically placed between the first waveguide section 202 and the second waveguide section 204 to match the input impedance related to the circuitry coupled to the first port 216.

The antenna section 206 has an inverted trapezoidal prism shape that is a hybridization of a traditional pyramid horn (e.g., all four walls of the horn flare away from an aperture) and a traditional step horn. The antenna section 206 has a first aperture 234. The first aperture 234 has the second length 222 and the first width 212 and is configured to align with the second port 226. A first step feature 236-1 extends from a first side of the first aperture 234 along the x-axis and towards the first port 216. A second step feature 236-2 extends from a second side of the first aperture 234, opposite the first side, along the x-axis away from the first port 216.

The antenna section has four walls 238. A first wall 238-1 extends along the z-axis from an edge of the first step feature 236-1 that is opposite the first side of the first aperture 234. Similarly, a second wall 238-2 extends along the z-axis from an edge of the second step feature 236-2 that is opposite the second side of the first aperture 234. A third wall 238-3 extends along the y-axis and the z-axis from a third side of the first aperture 234, orthogonal to the first side and the second side, and a fourth wall 238-4 extends along the y-axis and the z-axis from a fourth side of the first aperture 234, opposite the third side. The third wall 238-3 and the fourth wall 238-4 both flare away from the first aperture 234 creating a flaring angle. The outer edges of the four walls 238 define a second aperture 240. Due to the step features 236 and the flaring angle, the second aperture 240 has a fifth length 242 (along the x-axis) and a third width 244 (along the y-axis) that is greater than the length and width (e.g., the second length 222 and the first width 212) of the first aperture 234.

The flaring angle between the third wall 238-3 and the fourth wall 238-4 is in the E-plane (e.g., yz-plane) and may generate a wide beam in the E-plane that has relatively moderate roll off. In contrast, the first wall 238-1 and the second wall 238-2 are parallel to one another with no flaring angle. This arrangement of the first wall 238-1 and the second wall 238-2 may generate a narrower beam in the H-plane (e.g., xz-plane) with low or minimal side lobes. The length of the step features 236 (e.g., the difference between the fifth length 242 and the second length 222) can be optimized to reduce impedance imbalance. That is, the ratio of the second length 222 of the first aperture 234 to the fifth length 242 along with a third height 246 (along the z-axis) of the four walls 238 can be optimized to achieve lower side lobes.

Figures 1, 3:
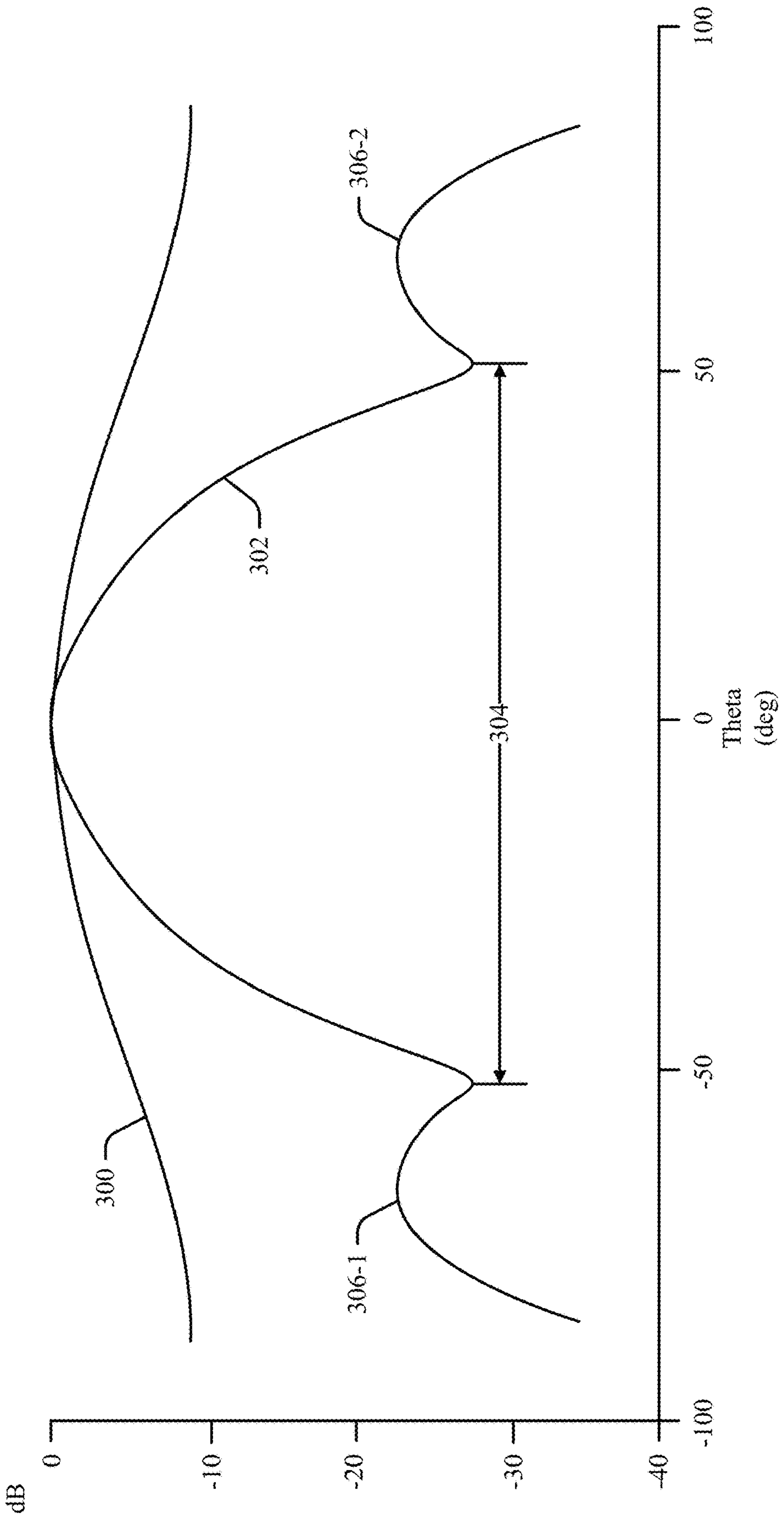
Figures 2, 3:
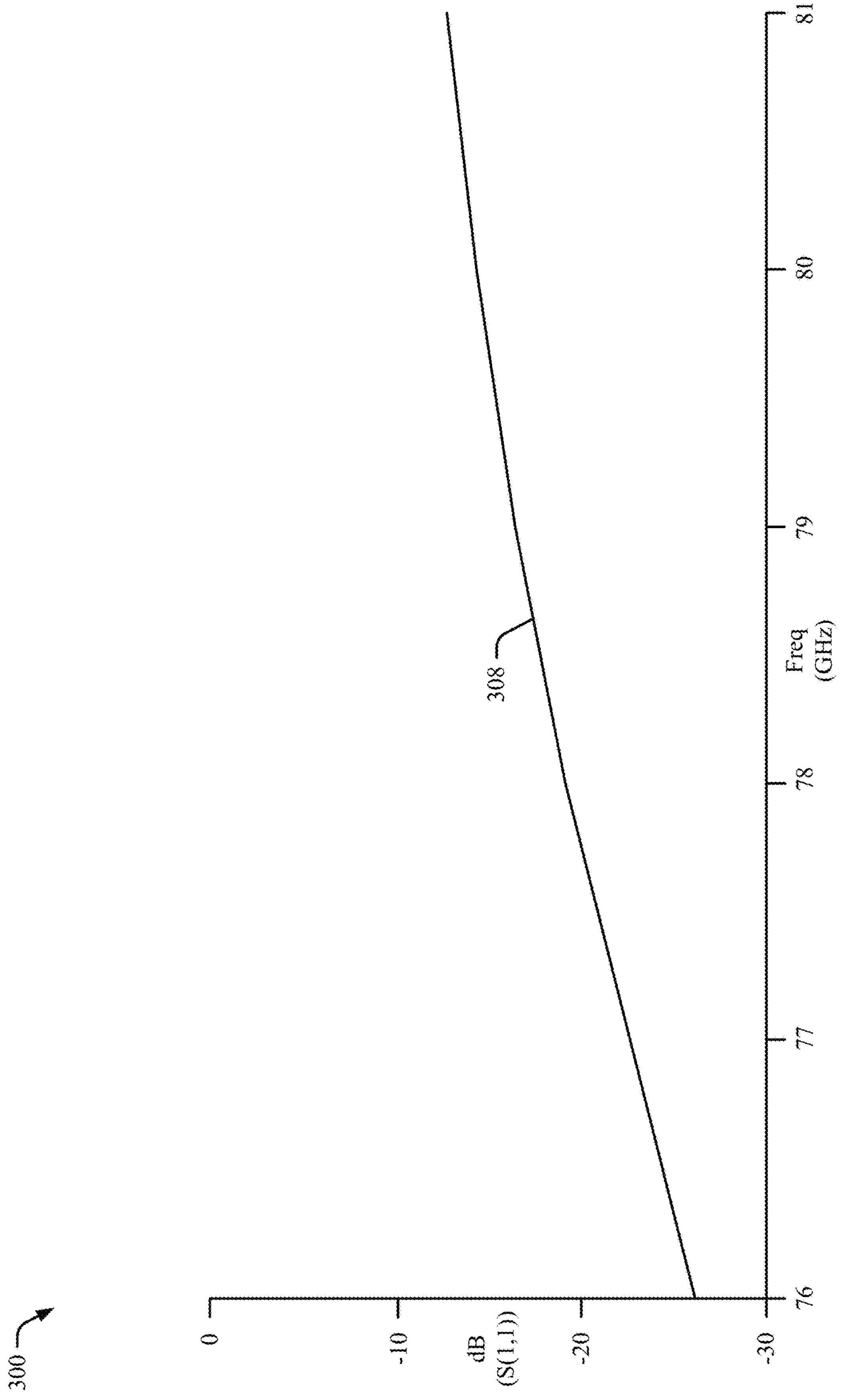

FIG. 3-1 illustrates example radiation beam characteristics of a hybrid horn waveguide antenna, in accordance with this disclosure. Beam pattern 300 represents a wider beam in the yz-plane with moderate roll off, and the flared sides (e.g., the sides 238-3 and 238-4) can be configured with a flare angle to expand or contract the wide beam pattern 300. The beam pattern 300 can be considered wide with moderate roll off because the pattern covers a wide FOV (e.g., minus 100 degrees to positive 100 degrees) while the beam loses relatively little strength (e.g., less than negative 10 decibels (dB)) across its FOV.

Beam pattern 302 represents a narrower beam in the xz-plane with low side-lobes. In this example, the beam pattern 302 has a narrow portion 304 that has close to 0 dB strength loss close to the center of the beam (e.g., 0 degrees) with rapid roll-off in either direction (e.g., negative 50 degrees to positive 50 degrees). The beam pattern 302 also has side-lobes 306-1 and 306-2. The side-lobes 306 can be considered low as their strength is below a threshold value (e.g., below negative 20 dB in this example). The low side-lobes can be achieved by optimizing the ratio of the second length 222 of the first aperture 234 (in FIG. 2) to the fifth length 242 and the height along the z-axis of the walls 238.

FIG. 3-2 illustrates example impedance matching characteristics provided by a hybrid horn waveguide antenna, in accordance with this disclosure. Impedance matching curve 308 is plotted along a range of operating frequencies from 76 GHz to 81 GHz which is a common frequency band for automotive-based radar systems. As illustrated in FIG. 3-2, the impedance matching curve 308 remains below negative 10 dB across the frequency band which is considered by the industry as adequate impedance matching. The hybrid horn waveguide antenna (e.g., the hybrid horn waveguide antenna 104) accomplishes improved impedance matching in part by having step features (e.g., the step features 236) only along the x-axis, as opposed to traditional antennas that also include step features along the y-axis. Further impedance matching improvements may be accomplished with the inclusion of the iris 208.

Example Manufacturing Methods

Figure 4:
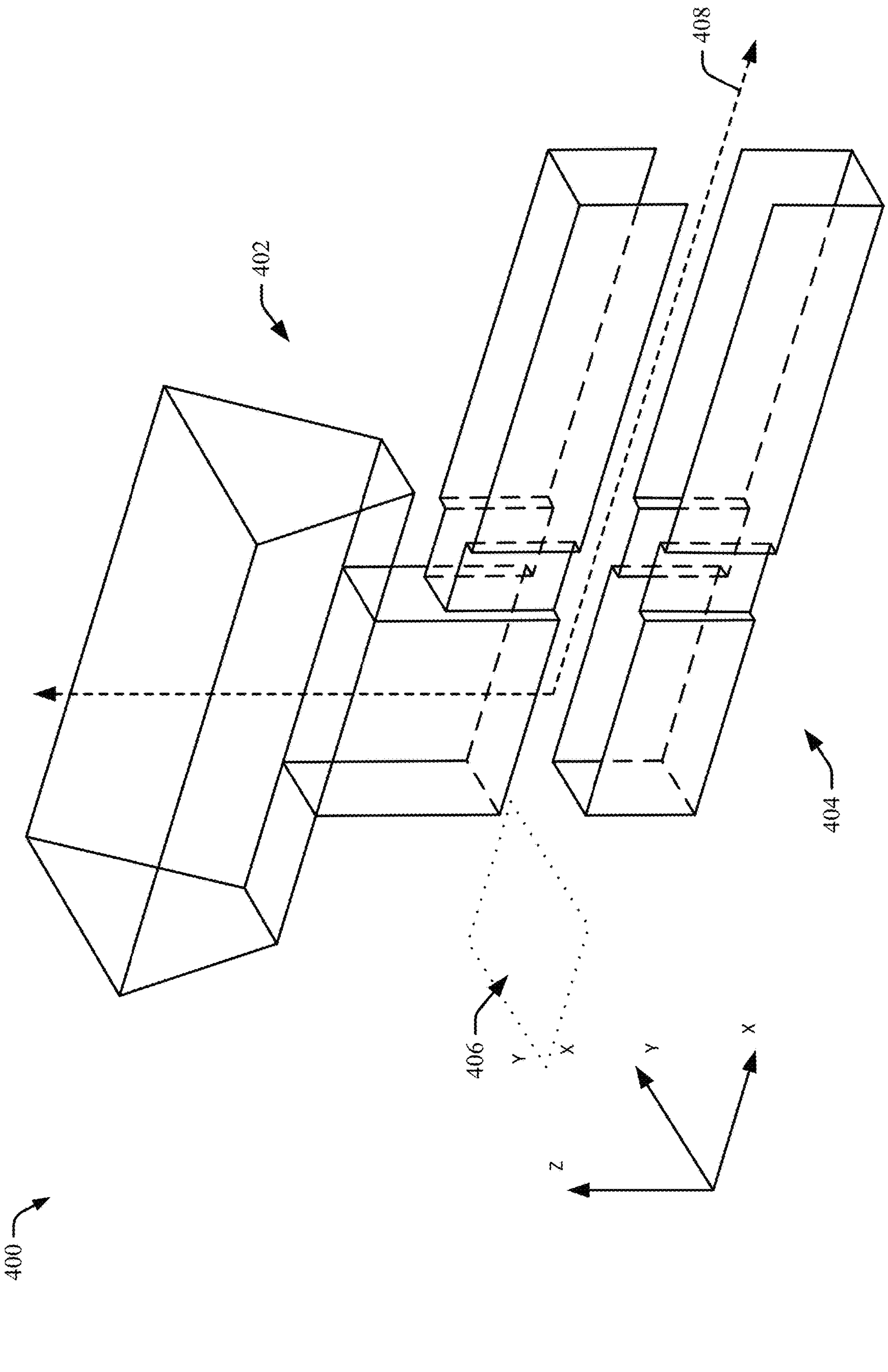
FIG. 4 illustrates a hybrid horn waveguide antenna separated into an upper structure and a lower structure for manufacturing purposes, in accordance with this disclosure.

FIG. 4 illustrates a hybrid horn waveguide antenna 400 (e.g., the hybrid horn waveguide antenna 104, the hybrid horn waveguide antenna 200) separated into an upper structure 402 and a lower structure 404 for manufacturing purposes, in accordance with this disclosure. The upper structure 402 and the lower structure 404 are separated along a separation plane 406 that is parallel to the xy-plane. The separation of the upper structure 402 and the lower structure 404 is located approximately midway along the walls of the first waveguide section that are parallel to the xz-plane. The purpose of separating the hybrid horn waveguide antenna in this fashion is to be able to easily form the upper structure 402 and the lower structure 404 utilizing an injection molding process or other manufacturing process.

Certain dimensions (as referenced in FIG. 2) including the differences in the heights of the first waveguide section 202 and the second waveguide section 204 (e.g., the difference between the first height 214 and the second height 224), and the width of the iris (e.g., the second width 232) may be determined based on limitations in the manufacturing process (e.g., the injection molding process). For example, the difference between the second height 224 and the first height 214 may be 1 mm or greater due to injection molding constraints. Similarly, the fourth length 230 of the iris 208 may also be 1 mm or greater, and the second width 232 may be no more than 0.8 mm to 0.9 mm less than the first width 212 due to these constraints. It should be noted that as injection molding constraints may change, so may the dimensions of the hybrid horn waveguide antenna 400.

Once the upper structure 402 and the lower structure 404 are mated, an energy path 408 is formed that travels along the x-axis and bends at a sharp right angle (e.g., 90-degree angle to travel along the z-axis. By having the 90-degree change in the energy path (e.g., no transitional rounded or curved edges, miters, or chamfers along the bend), the energy may have a shortest possible path across the separation plane. Because of the shape, energy leakage through the separation plane may be reduced or virtually eliminated.

Figure 5:
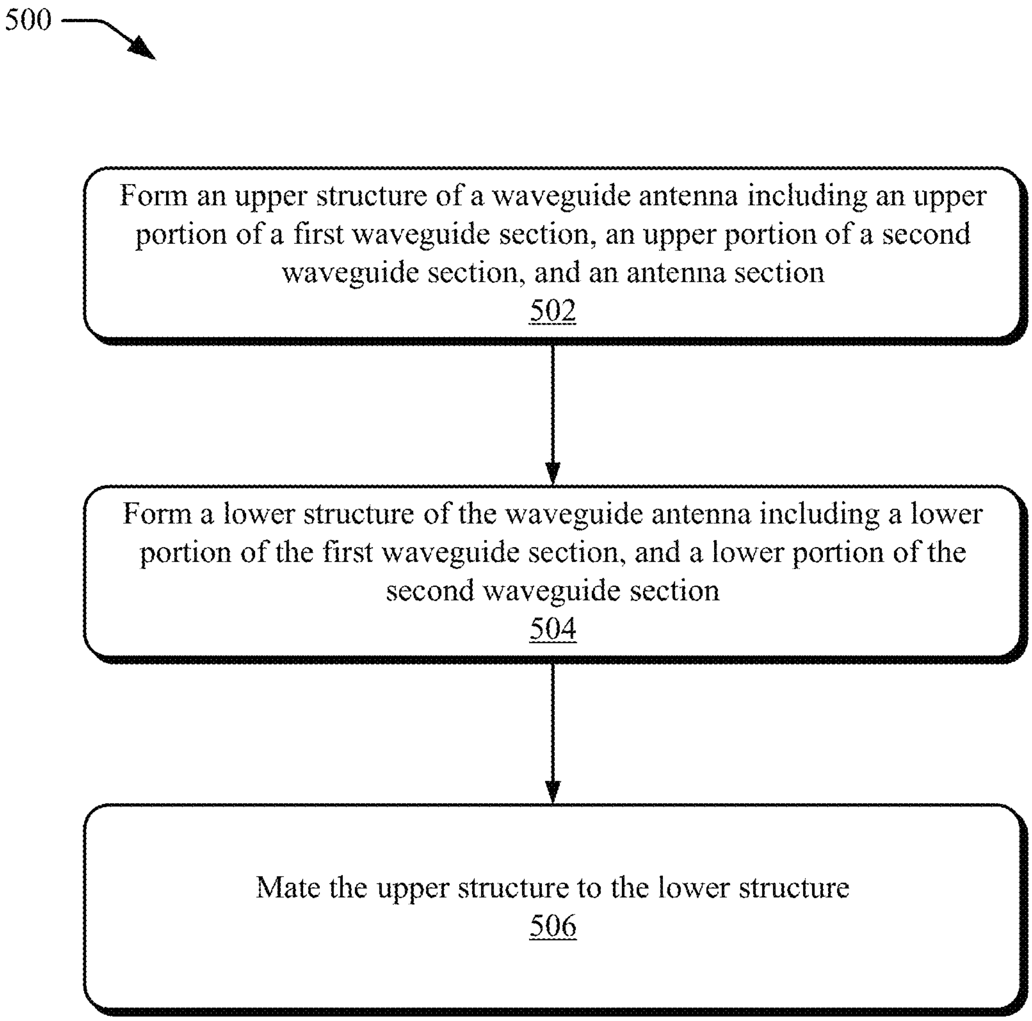
FIG. 5 illustrates an example method for forming a hybrid horn waveguide antenna, in accordance with this disclosure.

FIG. 5 illustrates an example method 500 for forming a hybrid horn waveguide antenna, in accordance with this disclosure. Method 500 is shown as sets of operations (or acts) performed, but not necessarily limited to the order or combinations in which the operations are shown herein. Further, any of one or more of the operations may be repeated, combined, or reorganized to provide other methods.

At step 502, an upper structure (e.g., the upper structure 402) of a waveguide antenna (e.g., the hybrid horn waveguide antenna 104, the hybrid horn waveguide antenna 200) is formed. The upper structure includes an upper portion of a first waveguide section (e.g., the first waveguide section 202), an upper portion of a second waveguide section (e.g., the second waveguide section 204), and an antenna section (e.g., the antenna section 206). Additionally, the upper structure can include an upper portion of an iris section (e.g., the iris 208). The upper structure creates an upper channel section.

At step 504, a lower structure (e.g., the lower structure 404) of the waveguide antenna is formed. The lower structure includes a lower portion of the first waveguide section, and a lower portion of the second waveguide section. Additionally, the lower structure can include a lower portion of the iris section. The lower portion creates a lower channel section.

At step 506, the upper structure 402 and the lower structure 404 are mated. Mating the upper structure 402 and the lower structure 404 creates a channel that defines an energy path (e.g., the energy path 408). The upper structure 402 may be held together by various means (e.g., external pressure source, screws). However, the use of solder or conductive adhesives may not be required due to the sharp right-angle bend in the resulting energy path. In this manner, a hybrid horn waveguide antenna may be formed that generates a wider beam with moderate roll off in one dimension and a narrower beam with low side-lobes in an orthogonal dimension and maintains good impedance matching with coupled circuitry.

Additional Examples

Some additional examples for a hybrid horn waveguide antenna are provided below.

Example 1: An apparatus comprising: a waveguide antenna configured to guide electromagnetic energy through a channel defining an energy path for the electromagnetic energy, the waveguide antenna comprising: a first waveguide section configured to propagate the energy path along an x-axis, the first waveguide section comprising: a first port centered around the x-axis at which the electromagnetic energy enters or exits the waveguide antenna; and a first channel portion extending longitudinally along the x-axis; a second waveguide section configured to propagate the energy path from the x-axis to a z-axis, the z-axis being orthogonal to the x-axis, the second waveguide section comprising: a second channel portion extending longitudinally along the z-axis; and a second port centered around the z-axis; and an antenna section having an inverted trapezoidal prism shape and configured to radiate or receive the electromagnetic energy, the antenna section comprising: a first aperture configured to align with the second port of the second waveguide section; a first step feature extending from a first side of the first aperture nearest to the first port along the x-axis towards the first port; a second step feature extending from a second side of the first aperture, opposite the first side, along the x-axis away from the first port; a first wall extending along the z-axis from an edge of the first step feature that is opposite the first side of the first aperture; a second wall extending along the z-axis from an edge of the second step feature that is opposite the second side of the first aperture; a third wall extending along a y-axis and the z-axis from a third side of the aperture, the y-axis being orthogonal to the x-axis and the z-axis, the third side being orthogonal to the first side and the second side, the third wall flaring away from the first aperture; a fourth wall extending along the y-axis and the z-axis from a fourth side of the first aperture, opposite the third side, the fourth wall flaring away from the first aperture; and a second aperture opposite the first aperture and defined by edges of the first wall, the second wall, the third wall, and the fourth wall.

Example 2: The apparatus of example 1, wherein a width of the first waveguide section along the y-axis and a width of the second waveguide section along the y-axis are approximately equal.

Example 3: The apparatus of example 1, wherein at least a portion of the second waveguide section has a height along the z-axis that is greater than a height of the first waveguide section along the z-axis.

Example 4: The apparatus of example 3, wherein the height of at least a portion of the second waveguide section is at least one millimeter greater than the height of the first waveguide section.

Example 5: The apparatus of example 3, further comprising: an iris disposed between the first waveguide section and the second waveguide section, the iris having a width along the y-axis that is not equal to the width of the first waveguide section and the width of the second waveguide section.

Example 6: The apparatus of example 5, wherein a location of the iris, dimensions of the iris, and dimensions of the first step feature and the second step feature are configured to match an input impedance to the waveguide antenna.

Example 7: The apparatus of example 6, wherein the iris is located such that the second waveguide section has no portion that extends longitudinally along the x-axis.

Example 8: The apparatus of example 6, wherein the width of the iris is less than or equal to one millimeter.

Example 9: The apparatus of example 6, wherein a length of the iris along the x-axis is equal to or greater than one millimeter.

Example 10: The apparatus of example 1, wherein the waveguide antenna is separated into an upper structure and a lower structure along a separation plane parallel to an xy-plane defined by the x-axis and the y-axis, the separation plane being located approximately midway along walls of the first waveguide section that are parallel to an xz-plane defined by the x-axis and the z-axis.

Example 11: The apparatus of example 10, wherein the lower structure and the upper structure are formed using an injection molding process.

Example 12: The apparatus of example 10, wherein the second waveguide section is configured to transition the energy path along the x-axis to along z-axis using a right-angle bend without a chamfer, miter, or curve, the right-angle bend configured to minimize energy leakage due to the separation of the waveguide antenna.

Example 13: The apparatus of example 1, wherein a ratio of a length of the first aperture along the x-axis to a length of the antenna section along the x-axis including the length of the first aperture, the length of the first step feature, and the length of the second step feature, and a height of the antenna section along the z-axis are configured to reduce side lobes of a beam generated by the waveguide antenna.

Example 14: A method comprising: forming an upper structure of a waveguide antenna configured to guide electromagnetic energy through a channel defining an energy path for the electromagnetic energy, the upper structure comprising: an upper portion of a first waveguide section including an upper portion of a first port and an upper portion of a first channel section; an upper portion of a second waveguide section including an upper portion of a second channel section and a second port that is parallel to a plane that is orthogonal to a plane that is parallel to the first port; an antenna section having an inverted trapezoidal prism shape, the antenna section comprising: a first aperture configured to align with the second port of the second waveguide section; a first step feature extending from a first side of the first aperture nearest to the first port along an x-axis towards the first port; a second step feature extending from a second side of the aperture, opposite the first side, along the x-axis away from the first port; a first wall extending along a z-axis from an edge of the first step feature that is opposite the first side of the aperture; a second wall extending along the z-axis from an edge of the second step feature that is opposite the second side of the aperture; a third wall extending along a y-axis and the z-axis from a third side of the aperture, the y-axis being orthogonal to the x-axis and the z-axis, the third side being orthogonal to the first side and the second side, the third wall flaring away from the third side; a fourth wall extending along the y-axis and the z-axis from a fourth side of the aperture, opposite the third side, the fourth wall flaring away from the fourth side; and a second aperture opposite the first aperture and defined by edges of the first wall, the second wall, the third wall, and the fourth wall; forming a lower structure of the waveguide antenna, the lower structure comprising: a lower portion of the first waveguide section including a lower portion of the first port and a lower portion of the first channel section; and a lower portion of a second waveguide section including a lower portion of the second channel section; and mating the upper structure to the lower structure.

Example 15: The method of example 14, wherein: the upper structure further comprises an upper portion of an iris disposed between the upper portion of the first waveguide section and the upper portion of the second waveguide section; and the lower structure further comprises a lower portion of the iris disposed between the lower portion of the first waveguide section and the lower portion of the second waveguide section.

Example 16: The method of example 15, wherein: a height, along the z-axis, of the upper portion of the first waveguide section and a height of the upper portion of the iris are equal; and a height, along the z-axis, of the upper portion of the second waveguide section extends along the z-axis such that the second port is at a height along the z-axis that is greater than the height of the upper portion of the first waveguide section and the height of the upper portion of the iris.

Example 17: The method of example 15, wherein, upon mating the upper structure and the lower structure, the second waveguide section bends the energy path at a right angle causing the energy path to transition from propagating along the x-axis to propagating along the z-axis.

Example 18: The method of example 14, wherein forming the upper structure and forming the lower structure utilizes injection molding.

Example 19: A system comprising: a monolithic microwave integrated circuit; and a waveguide antenna electrically coupled to the monolithic microwave integrated circuit and configured to guide electromagnetic energy through a channel defining an energy path for the electromagnetic energy, the waveguide antenna comprising: a first waveguide section configured to propagate the energy path along an x-axis, the first waveguide section comprising: a first port centered around the x-axis at which the electromagnetic energy enters or exits the waveguide antenna; and a first channel portion extending longitudinally along the x-axis; a second waveguide section configured to propagate the energy path from the x-axis to a z-axis, the z-axis being orthogonal to the x-axis, the second waveguide section comprising: a second channel portion extending longitudinally along the z-axis; and a second port centered around the z-axis; and an antenna section having an inverted trapezoidal prism shape and configured to radiate or receive the electromagnetic energy, the antenna section comprising: a first aperture configured to align with the second port of the second waveguide section; a first step feature extending from a first side of the first aperture nearest to the first port along the x-axis towards the first port; a second step feature extending from a second side of the aperture, opposite the first side, along the x-axis away from the first port; a first wall extending along the z-axis from an edge of the first step feature that is opposite the first side of the aperture; a second wall extending along the z-axis from an edge of the second step feature that is opposite the second side of the aperture; a third wall extending along a y-axis and the z-axis from a third side of the aperture, the y-axis being orthogonal to the x-axis and the z-axis, the third side being orthogonal to the first side and the second side, the third wall flaring away from the third side; a fourth wall extending along the y-axis and the z-axis from a fourth side of the aperture, opposite the third side, the fourth wall flaring away from the fourth side; and a second aperture opposite the first aperture and defined by edges of the first wall, the second wall, the third wall, and the fourth wall.

Example 20: The system of example 19, wherein the waveguide antenna further comprises: an iris disposed between the first waveguide section and the second waveguide section, the iris having a width along the y-axis that is not equal to the width of the first waveguide section and the width of the second waveguide section.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with waveguides and antennas can occur in other systems. Therefore, although described in relation to a radar system, the apparatuses and techniques of the foregoing description can be applied to other systems that would benefit from propagating energy through a waveguide and/or antenna.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An apparatus comprising:

a waveguide antenna configured to guide electromagnetic energy through a channel defining an energy path for the electromagnetic energy, the waveguide antenna comprising:

a first waveguide section configured to propagate the energy path along an x-axis, the first waveguide section comprising:

a first port centered around the x-axis at which the electromagnetic energy enters or exits the waveguide antenna; and a first channel portion extending longitudinally along the x-axis;

a second waveguide section configured to propagate the energy path from the x-axis to a z-axis, the z-axis being orthogonal to the x-axis, the second waveguide section comprising:

a second channel portion extending longitudinally along the z-axis; and a second port centered around the z-axis; and an antenna section having an inverted trapezoidal prism shape and configured to radiate or receive the electromagnetic energy, the antenna section comprising:

a first aperture configured to align with the second port of the second waveguide section, the first aperture of the antenna section having a first width along a y-axis and a first length along the x-axis such that the first length along the x-axis is greater than the first width along the y-axis;

a first step feature extending from a first side of the first aperture nearest to the first port along the x-axis towards the first port;

a second step feature extending from a second side of the first aperture, opposite the first side, along the x-axis away from the first port;

a first wall extending along the z-axis from an edge of the first step feature that is opposite the first side of the first aperture;

a second wall extending along the z-axis from an edge of the second step feature that is opposite the second side of the first aperture;

a third wall extending along the y-axis and the z-axis from a third side of the first aperture, the y-axis being orthogonal to the x-axis and the z-axis, the third side being orthogonal to the first side and the second side, the third wall flaring away from the first aperture;

a fourth wall extending along the y-axis and the z-axis from a fourth side of the first aperture, opposite the third side, the fourth wall flaring away from the first aperture; and a second aperture opposite the first aperture and defined by edges of the first wall, the second wall, the third wall, and the fourth wall, the second aperture having a second width along the y-axis greater than the first width and a second length along the x-axis equal to the first length such that the waveguide antenna is a hybrid horn waveguide antenna with the first length and the second length along the x-axis being greater than the first width along the y-axis and the second width along the y-axis, respectively and step features only along the x-axis among the x-axis and the y-axis.

2. The apparatus of claim 1, wherein a width of the first waveguide section along the y-axis and a width of the second waveguide section along the y-axis are approximately equal.

3. The apparatus of claim 1, wherein at least a portion of the second waveguide section has a height along the z-axis that is greater than a height of the first waveguide section along the z-axis.

4. The apparatus of claim 3, wherein the height of at least a portion of the second waveguide section is at least one millimeter greater than the height of the first waveguide section.

5. The apparatus of claim 3, further comprising:

an iris disposed between the first waveguide section and the second waveguide section, the iris having a width along the y-axis that is not equal to the width of the first waveguide section and the width of the second waveguide section.

6. The apparatus of claim 5, wherein a location of the iris, dimensions of the iris, and dimensions of the first step feature and the second step feature are configured to match an input impedance to the waveguide antenna.

7. The apparatus of claim 6, wherein the iris is located such that the second waveguide section has no portion that extends longitudinally along the x-axis.

8. The apparatus of claim 6, wherein the width of the iris is less than or equal to one millimeter.

9. The apparatus of claim 6, wherein a length of the iris along the x-axis is equal to or greater than one millimeter.

10. The apparatus of claim 1, wherein the waveguide antenna is separated into an upper structure and a lower structure along a separation plane parallel to an xy-plane defined by the x-axis and the y-axis, the separation plane being located approximately midway along walls of the first waveguide section that are parallel to an xz-plane defined by the x-axis and the z-axis.

11. The apparatus of claim 10, wherein the lower structure and the upper structure are formed using an injection molding process.

12. The apparatus of claim 10, wherein the second waveguide section is configured to transition the energy path along the x-axis to along the_z-axis using a right-angle bend without a chamfer, miter, or curve, the right-angle bend configured to minimize energy leakage due to separation of the waveguide antenna along the separation plane.

13. The apparatus of claim 1, wherein a ratio of a length of the first aperture along the x-axis to a length of the antenna section along the x-axis including the length of the first aperture, the length of the first step feature, and the length of the second step feature, and a height of the antenna section along the z-axis are configured to reduce side lobes of a beam generated by the waveguide antenna.

14. A method comprising:

forming an upper structure of a waveguide antenna configured to guide electromagnetic energy through a channel defining an energy path for the electromagnetic energy, the upper structure comprising:

an upper portion of a first waveguide section including an upper portion of a first port and an upper portion of a first channel section;

an upper portion of a second waveguide section including an upper portion of a second channel section and a second port that is parallel to a plane that is orthogonal to a plane that is parallel to the first port;

an antenna section having an inverted trapezoidal prism shape, the antenna section comprising:

a first aperture configured to align with the second port of the second waveguide section, the first aperture of the antenna section having a first width along a y-axis and a first length along an x-axis such that the first length along the x-axis is greater than the first width along the y-axis;

a first step feature extending from a first side of the first aperture nearest to the first port along the x-axis towards the first port;

a second step feature extending from a second side of the first aperture, opposite the first side, along the x-axis away from the first port;

a first wall extending along a z-axis from an edge of the first step feature that is opposite the first side of the first aperture;

a second wall extending along the z-axis from an edge of the second step feature that is opposite the second side of the first aperture;

a third wall extending along the y-axis and the z-axis from a third side of the first aperture, the y-axis being orthogonal to the x-axis and the z-axis, the third side being orthogonal to the first side and the second side, the third wall flaring away from the third side;

a fourth wall extending along the y-axis and the z-axis from a fourth side of the first aperture, opposite the third side, the fourth wall flaring away from the fourth side; and a second aperture opposite the first aperture and defined by edges of the first wall, the second wall, the third wall, and the fourth wall, the second aperture having a second width along the y-axis greater than the first width and a second length along the x-axis equal to the first length such that the waveguide antenna is a hybrid horn waveguide antenna with the first length and the second length along the x-axis being greater than the first width along the y-axis and the second width along the y-axis, respectively and step features only along the x-axis among the x-axis and the y-axis;

forming a lower structure of the waveguide antenna, the lower structure comprising:

a lower portion of the first waveguide section including a lower portion of the first port and a lower portion of the first channel section; and a lower portion of the second waveguide section including a lower portion of the second channel section; and mating the upper structure to the lower structure.

15. The method of claim 14, wherein:

the upper structure further comprises an upper portion of an iris disposed between the upper portion of the first waveguide section and the upper portion of the second waveguide section; and the lower structure further comprises a lower portion of the iris disposed between the lower portion of the first waveguide section and the lower portion of the second waveguide section.

16. The method of claim 15, wherein:

a height, along the z-axis, of the upper portion of the first waveguide section and a height of the upper portion of the iris are equal; and a height, along the z-axis, of the upper portion of the second waveguide section extends along the z-axis such that the second port is at a height along the z-axis that is greater than the height of the upper portion of the first waveguide section and the height of the upper portion of the iris.

17. The method of claim 15, wherein, upon mating the upper structure and the lower structure, the second waveguide section bends the energy path at a right angle causing the energy path to transition from propagating along the x-axis to propagating along the z-axis.

18. The method of claim 14, wherein forming the upper structure and forming the lower structure utilizes injection molding.

19. A system comprising:

a monolithic microwave integrated circuit; and a waveguide antenna electrically coupled to the monolithic microwave integrated circuit and configured to guide electromagnetic energy through a channel defining an energy path for the electromagnetic energy, the waveguide antenna comprising:

a first waveguide section configured to propagate the energy path along an x-axis, the first waveguide section comprising:

a first port centered around the x-axis at which the electromagnetic energy enters or exits the waveguide antenna; and a first channel portion extending longitudinally along the x-axis;

a second waveguide section configured to propagate the energy path from the x-axis to a z-axis, the z-axis being orthogonal to the x-axis, the second waveguide section comprising:

a second channel portion extending longitudinally along the z-axis; and a second port centered around the z-axis; and an antenna section having an inverted trapezoidal prism shape and configured to radiate or receive the electromagnetic energy, the antenna section comprising:

a first aperture configured to align with the second port of the second waveguide section, the first aperture of the antenna section having a first width along a y-axis and a first length along the x-axis such that the first length along the x-axis is greater than the first width along the y-axis;

a first step feature extending from a first side of the first aperture nearest to the first port along the x-axis towards the first port;

a second step feature extending from a second side of the first aperture, opposite the first side, along the x-axis away from the first port;

a first wall extending along the z-axis from an edge of the first step feature that is opposite the first side of the first aperture;

a second wall extending along the z-axis from an edge of the second step feature that is opposite the second side of the first aperture;

a third wall extending along the y-axis and the z-axis from a third side of the first aperture, the y-axis being orthogonal to the x-axis and the z-axis, the third side being orthogonal to the first side and the second side, the third wall flaring away from the third side;

a fourth wall extending along the y-axis and the z-axis from a fourth side of the first aperture, opposite the third side, the fourth wall flaring away from the fourth side; and a second aperture opposite the first aperture and defined by edges of the first wall, the second wall, the third wall, and the fourth wall, the second aperture having a second width along the y-axis greater than the first width and a second length along the x-axis equal to the first length such that the waveguide antenna is a hybrid horn waveguide antenna with the first length and the second length along the x-axis being greater than the first width along the y-axis and the second width along the y-axis, respectively and step features only along the x-axis among the x-axis and the y-axis.

20. The system of claim 19, wherein the waveguide antenna further comprises:

an iris disposed between the first waveguide section and the second waveguide section, the iris having a width along the y-axis that is not equal to the width of the first waveguide section and the width of the second waveguide section.

* * * * *